(12) United States Patent
Sano et al.

(10) Patent No.: US 6,419,306 B2
(45) Date of Patent: Jul. 16, 2002

(54) ILLUMINATING PLATE FOR CAR

(75) Inventors: Yoshio Sano; Osamu Yamanaka; Yasumasa Tatewaki; Minoru Shibata; Katuhiro Katagiri; Kazumichi Shigeno; Hiroshi Suyama, all of Aichi (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/732,910

(22) Filed: Dec. 11, 2000

(30) Foreign Application Priority Data

Dec. 10, 1999 (JP) ............................ 11-351943

(51) Int. Cl.$^7$ ................................. B60Q 1/26
(52) U.S. Cl. ..................... 296/209; 40/583; 362/495
(58) Field of Search ................ 296/209; 40/564, 40/579, 583; 362/495

(56) References Cited

U.S. PATENT DOCUMENTS

| | | | |
|---|---|---|---|
| 898,184 A | * 9/1908 | Carter | 40/579 |
| 4,457,089 A | * 7/1984 | Phillips, Jr. | 40/544 |
| 4,603,065 A | * 7/1986 | Mori et al. | 428/31 |
| 4,965,950 A | * 10/1990 | Yamada | 40/546 |
| 5,446,634 A | * 8/1995 | Okubo | |
| 5,641,221 A | * 6/1997 | Schindele et al. | |

FOREIGN PATENT DOCUMENTS

JP  6-18078  3/1994

* cited by examiner

*Primary Examiner*—Dennis H. Pedder
(74) *Attorney, Agent, or Firm*—Pillsbury Winthrop LLP

(57) ABSTRACT

An illuminating plate for a car has a light guide plate; a cover provided with at least one light transmitting window, and disposed on the light guide plate; and light reflecting layer formed on the rear surface of the light guide plate. The light reflecting layer is formed to cover an area where the light is projected onto the rear surface of the light guide plate through the corresponding light transmitting window, and the light reflecting layer being slightly larger than the area.

11 Claims, 4 Drawing Sheets

ILLUMINATING PLATE FOR CAR

BACKGROUND OF THE INVENTION

1. Field of the Invention

The present invention relates to an illuminating plate for a car, and particularly relates to an illuminating plate such as a scuff plate or the like for indicating specific shapes with light from a light source.

The present application is based on Japanese Patent Application No. Hei. 11-351943, which is incorporated herein by reference.

2. Description of the Related Art

A scuff plate or the like designed to indicate specific shapes, specific characters, or the like, is hitherto used as an interior part of a car. For example, JP-U-6-18078 discloses a plate with an illuminator provided in a side step portion. In the plate, a light emitting portion is coated with transparent resin (light guide), and further covered with a cover in which light transmitting holes each having a desired shape are punched like windows. Thus, light from a light source is taken out through the window-like light transmitting holes provided in the cover, so that the desired shapes are indicated.

With such a configuration, the light emitting portion, the light guide plate and the cover are put on one another sequentially so that the total thickness of the plate increases. In addition, the light emitting portion is located just under the cover through the light guide plate so that a load from the plate top surface (cover surface) is applied directly to the light emitting portion. As a result, for example, if the plate is installed, like a scuff plate, in a place where the plate may be trodden by a crew who is getting on/off, a load not lower than necessary one may be given to the light emitting portion so as to damage the function of the light emitting portion.

As means for solving the foregoing problems, there is considered a method in which a light emitting portion, that is, a light source is disposed not under a light guide plate but on the side of a light guide plate so that light is introduced from a side surface of the light guide plate. In this method, for example, a reflecting layer is provided, by rough surface treatment, white print, or the like, all over the surface of the light guide plate opposite to the surface which is covered with a cover. The light introduced from the side surface of the light guide plate is reflected toward the cover by the reflecting layer provided thus, so that the light is taken out through window-like light transmitting holes of the cover. With such a configuration, however, the reflecting layer is so broad that the reflection efficiency becomes insufficient. As a result, there is a fear that unevenness appears in light emission. It is also considered that the reflecting layer is not formed all over the surface but printed like dots so as to reduce the reflection area. In this case, however, there is a fear that the light taken out through the light transmitting hole of the cover is observed to be dotted. That is not preferred in view of design.

SUMMARY OF THE INVENTION

According to a first aspect of the present invention, which has been developed in consideration of the foregoing problems, it is an object of the present invention to provide an illuminating plate of a car which can indicate a desired character, a desired figure, or the like, with a uniform light volume all over an indicating portion, and which is thin and excellent in durability. The illuminating plate has a configuration which comprises:

An illuminating plate for a car, comprising:

a light guide plate;

a light source which is located on a side end of said light guide plate;

a cover disposed on a front surface of said light guide plate and provided with at least one light transmitting window; and at least one light reflecting layer formed on a rear surface of said light guide plate so as to cover at least a corresponding area where said light transmitting window is projected onto said rear surface, and said light reflecting layer not covering all over the rear surface of said light guide plate;

with such a configuration, the light reflecting layer is formed only in a portion corresponding to each of the light transmitting windows formed in the cover. Accordingly, the area of the light reflecting layers can be reduced, so that light from a light source can be condensed onto the whole of the light reflecting layers uniformly. It is therefor possible to make light emission with a uniform light volume all over the light reflecting layers. In addition, the light emitting portion is not provided in a position where the light emitting portion, the cover and the light guide plate are put on one another. Accordingly, the illuminating plate as a whole can be made thin. Further, the light source can be provided in any desirable position in the lateral direction of the light guide plate. Accordingly, even in the case where the illuminating plate is installed in a position where a load is given thereto, it is possible to prevent the influence of the load on the light source, so that it is possible to improve the durability.

DETAILED DESCRIPTION OF THE PREFERRED EMBODIMENTS

The configuration according to the first aspect of the present invention will be described below with reference to an embodiment.

Figure 1:
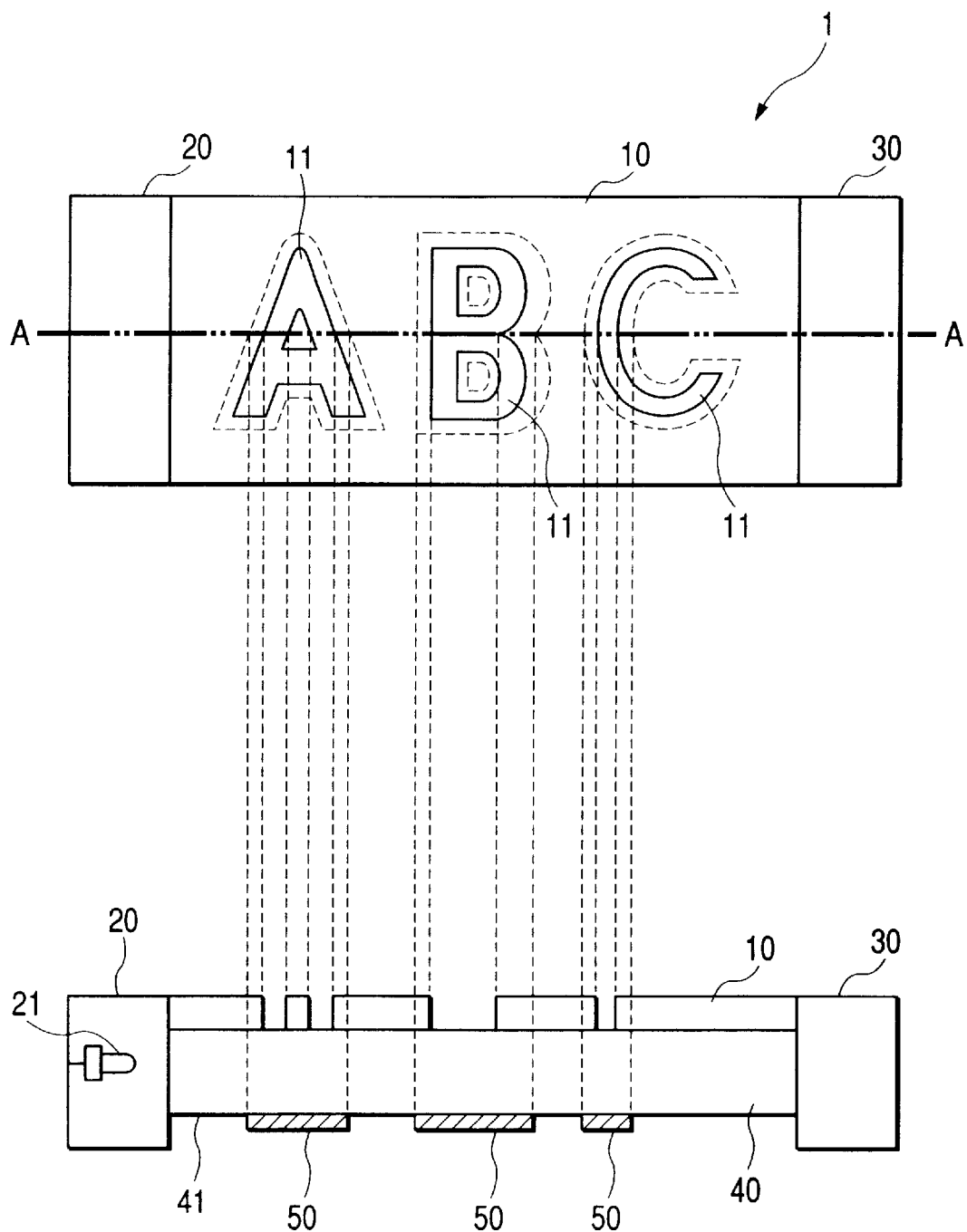
FIG. 1 is a top view of a scuff plate according to an embodiment in a first aspect of the present invention, and a sectional view taken on line A—A.

FIG. 1 includes a top view of a scuff plate 1 according to an embodiment in the first aspect of the present invention, and a sectional view taken on line A—A. The scuff plate 1 is roughly constituted by a cover 10, housings 20 and 30, and a light guide plate 40.

The cover 10 is made of material which does not transmit light. For example, various metals, alloys, etc. may be used therefor. Of course, material such as not-transparent resin, not-transparent plastic, or the like, may be used so long as it does not transmit light. A thin plate of such material is formed by press work or the like so as to form a cover having a desired shape. Although the cover 10 has a rectangular shape in plan view in this embodiment, the shape is not limited to this, but is defined optionally in accordance with the characters to be indicated, the place where the scuff plate 1 is attached, and so on. Light transmitting windows 11 are formed like characters in the cover 10. Figures or desired graphic designs as well as such characters shown in this embodiment can be punched out by press work or the like so as to form the window-like light transmitting windows 11. Alternatively, light non-transmissive ink may be printed to portions excluding the desired shape of the cover 10 so as to form the light transmitting windows.

The light transmitting windows 11 may be filled with transparent resin, such as polyvinyl chloride, epoxy resin, polycarbonate, polymethyl methacrylate or the like. In addition, the whole of the scuff plate 1 may be coated with transparent resin or the like. This coating improves the durability of the scuff plate.

The housing 20 is provided for the protection of the light guide plate 40, and so on. The housing 30 is provided also for the protection of the light guide plate 40, and so on.

A light source 21 is provided inside the housing 20. The light source 21 is constituted by an LED light source. In this embodiment, an RGB-type LED which can emit any desirable color is used. Of course, another type of LED or a bulb may be used as the light source. In view of power consumption and heat generation, it is preferable that an LED is used as the light source.

The light source 21 is connected to a not-shown power supply and a not-shown control circuit so that the lighting state of the light source 21 is controlled. For example, the light source 21 may be turned on/off in response to the open/close of a door. Alternatively, the light source 21 may be turned on/off in response to the one/off of a room lamp or a front lamp.

The light guide plate 40 is put under the cover 10. The light guide plate 40 is made of transparent resin or glass, or the like. If there is a fear that an external load is given to the light guide plate 40 like the case in a scuff plate, it is preferable that high-strength material is used. For example, epoxy resin, acrylic resin, or polycarbonate may be used. In addition, the front surface or the rear surface of the light guide plate 40 may be finished to be concave or convex so that the light guide plate 40 can have a lens effect.

Reflecting layers 50 made of light reflective ink are provided on a rear surface 41 of the light guide plate 40. In this embodiment, the reflecting layers 50 are formed of white ink by silk-screen printing. Such reflecting layers may be formed by another printing method, vapor deposition, sputtering, or the like. Alternatively, the reflecting layers may be provided by pasting a white tape to the rear surface 41 of the light guide plate 40. As the light reflective ink, high-reflective one is used. Preferably, white ink is used. Alternatively, the light guide plate rear surface 41 may be roughed by etching, sand blasting, electric-discharge machining, or the like, so as to form the reflecting layers.

The reflecting layers 50 are formed not all over the light guide plate rear surface 41 but in the respective areas corresponding to the light transmitting windows 11 of the cover 10. Since the area of the reflecting layer 50 is reduced thus, the area where the light from the light source 21 is condensed and reflected is reduced. As a result, uniform light emission is performed all over the reflecting layers 50. In detail, the reflecting layers 50 are formed over the respective area where the light transmitting windows 11 are orthographically projected onto the light guide plate rear surface 41. Each reflecting layer 50 has an area which is slightly larger than the aforementioned area where the corresponding window 11 is projected onto the light guide plate. That is, each reflecting layer 50 is provided to cover at least the area of the light guide plate rear surface 41 which can be viewed through the corresponding light transmitting window 11 directly in front of the scuff plate 1 from the cover 10 side. More preferably, as shown in FIG. 1, each reflecting layer 50 is formed in the area having the shape schematically similar to that of the corresponding light transmitting window 11. Thus, the reflecting layer is provided also in the area of the light guide plate rear surface 41 which can be viewed through the corresponding light transmitting window 11 of the case 10 even when the scuff plate 1 is viewed obliquely. As a result, the state of light emission through the light transmitting windows 11 is prevented from changing in accordance with the angle to see. Alternatively, the shape of each reflecting layer 50 may be provided not to be similar to but to be matched to the shape of the corresponding light transmitting window 11. For example, in this embodiment, a triangle is matched to the character "A", and quadrangles are matched to the characters "B" and "C" respectively.

The light emitted from the light source 21 is condensed on the reflecting layers 50 through the light guide plate 40, and then reflected toward the cover 10. The reflected light is taken out to the outside through the light transmitting windows 11 of the cover 10.

Next, description will be made about a second aspect of the present invention. According to the second aspect, it is an object to provide an illuminating plate which changes its indicating mode by use of a half mirror effect. The configuration is as follows.

The illuminating plate has a configuration comprises:
a light guide plate;
a light source which is located on a side end of said light guide plate;
a cover disposed on a front surface of said light guide plate and provided with light transmitting window; and
at least one light reflecting layer formed on a rear surface of said light guide plate so as to cover at least a corresponding area where said light transmitting window is projected onto said rear surface, and said light reflecting layer not covering all over the rear surface of said light guide plate;
wherein at least one of said front surface and said rear surface of said light guide plate is subjected to half mirror treatment.

With such a configuration, in the state where light from a light source is not introduced to the light guide plate (in the state where the outside is brighter than the inside of the light guide plate), light irradiation into the inside of the light guide plate from the outside is reflected on the light guide plate front surface subjected to half mirror treatment. Due to this reflected light, metallic color is observed through the light transmitting windows of the cover. On the other hand, in the state where light from the light source is introduced to the light guide plate (in the state where the inside of the light guide plate is brighter than the outside), light emitted from the light source is taken out to the outside by the half mirror effect. Thus, the color of the light source is observed. In such a manner, there is provided an illuminating plate in which the observed color is changed in accordance with the on/off of the light source.

The configuration in the second aspect of the present invention will be described below with reference to the drawings. Parts the same as those in the scuff plate 1 according to the embodiment in the first aspect are referenced correspondingly, and the description thereof will be therefore omitted.

Figure 2:
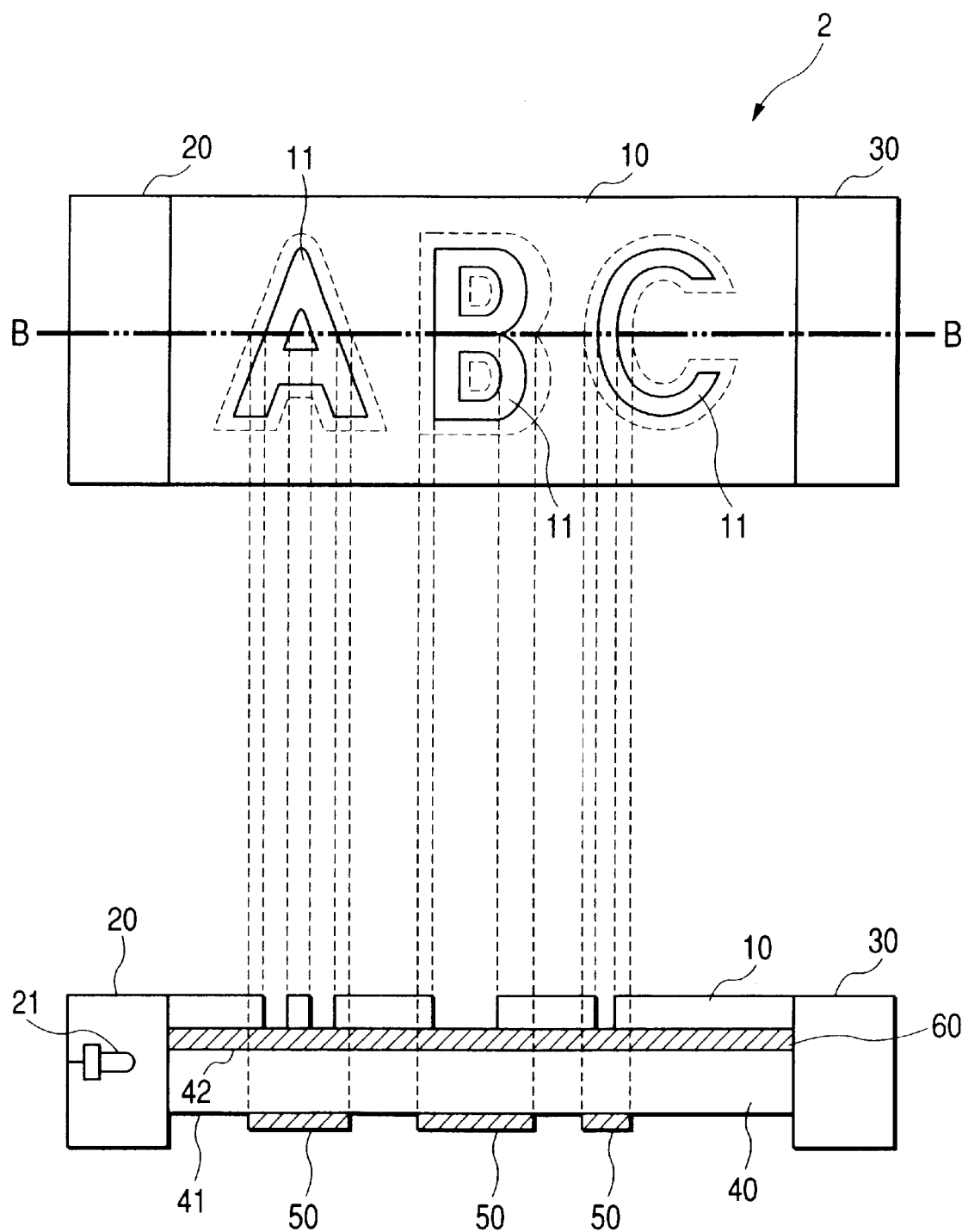
FIG. 2 is a top view of a scuff plate according to an embodiment in a second aspect of the present invention, and a sectional view taken on line B—B.

FIG. 2 includes a top view of a scuff plate 2 and a sectional view taken on line B—B.

Figure 3:
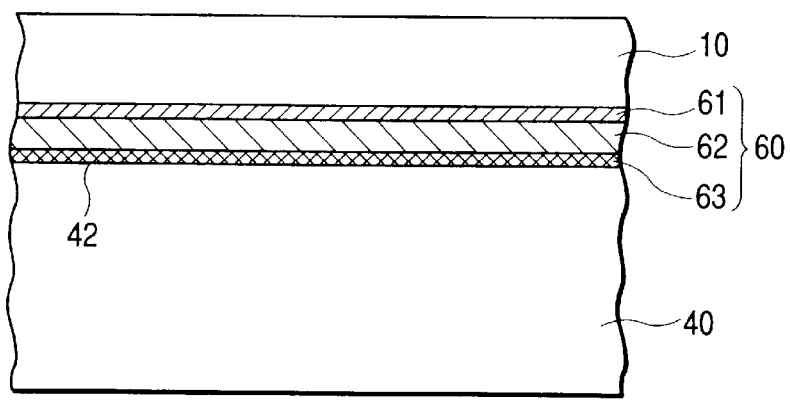
FIG. 3 is apartially enlarged sectional view of the scuff plate according to the embodiment in the second aspect.
Figure 4:
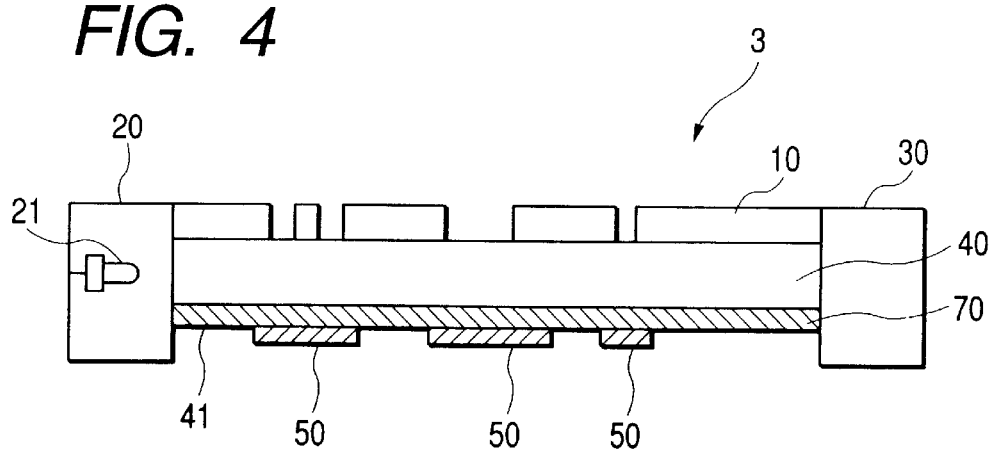
FIG. 4 is a sectional view of the scuff plate according to the embodiment in the second aspect.

A half mirror layer 60 is formed on a front surface 42 of a light guide plate 40. The half mirror layer 60 is constituted by three layers as shown in FIG. 3, that is, an ink layer 61, a protective layer 62 and a metal layer 63 which are put on one another sequentially in the ascending order of the distance from the cover 10.

The method of forming the half mirror layer 60 will be shown by way of example as follows. First, Al is vapor-deposited on the light guide plate front surface 42 so as to form the metal layer 63 of an Al thin film. The metal layer 63 is formed so as to be thick enough to reflect, on its front surface, light having brightness in the car in the daytime, and so as to be thin enough to transmit light from a light source 21 to thereby obtain a half mirror effect. Next, transparent resin such as epoxy resin or the like is put on the metal layer 63 by printing, coating, or the like, so as to form the protective layer 62. Finally, the ink layer 61 is formed by printing, coating, or the like, with color ink of yellow or the like. Of course, the method of forming the half mirror layer 60 is not limited to this. In addition, the materials of the metal layer and the protective layer, and the material and color of the ink layer may be selected optionally.

Next, description will be made about the operation and effect of the half mirror layer 60. In the state where the light source 21 is not turned on, that is, in the state where the outside is brighter than the inside of the scuff plate 2, light from the outside is radiated toward the light guide plate 40 through the light transmitting windows 11 of the cover 10. Such light is reflected on the metal layer 63 of the half mirror layer 60, transmitted through the protective layer 62 and the ink layer 61, passed through the light transmitting windows 11 of the cover 10 again, and taken out to the outside. The metallic color light reflected on the metal layer 63 is colored with the color of the ink layer 61 when the light passes through the ink layer 61. As a result, the light taken out to the outside is recognized as a mixed color of the metallic color and the color of the ink layer 61. For example, when the silver of Al and the yellow are mixed with each other, the light is recognized as golden light.

On the other hand, when the light source 21 is turned on to introduce light into the light guide plate 40 in the state where the outside is darker (for example, in the nighttime), the introduced light is reflected on the reflecting layer 50 so as to go toward the cover 10. Thus, the reflected light reaches the metal layer 63 of the half mirror layer 60. The metal layer 63 is formed so as to be thin enough to transmit the light from the light source 21. Therefore, the light emitted from the light source 21 and reached the metal layer 63 is transmitted through the metal layer 63, the protective layer 62 and the ink layer 61 sequentially, and then taken out to the outside through the light transmitting windows 11 of the cover 10. In such a manner, when the light source 21 is turned on, the light from the light source 21 is taken out through the light transmitting windows 11 so that the color of the light emitted from the light source 21 is observed.

Figure 5:
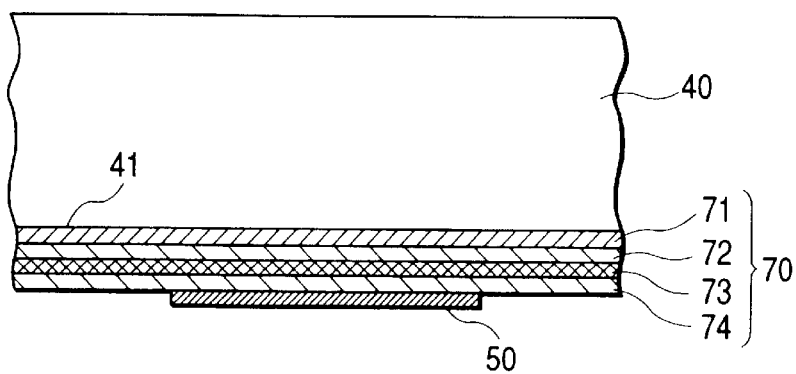
FIG. 5 is a partially enlarged sectional view of the scuff plate according to the embodiment in the second aspect.

FIG. 5 is a sectional view of a scuff plate 3 in which a half mirror layer 70 is provided on a rear surface 41 of a light guide plate 40. As shown in FIG. 5, the half mirror layer 70 is constituted by an ink layer 71, a protective layer 72, a metal layer 73 and a protective layer 74 which are put on one another sequentially in the ascending order of the distance from the light guide plate rear surface 41. The ink layer 71 and the metal layer 73 are formed of the same materials and by the same methods as those of the ink layer 61 and the metal layer 63 in the aforementioned scuff plate 2, respectively. Similarly, the protective layers 72 and 74 are formed of the same material and by the same method as that of the aforementioned protective layer 62.

In addition, reflecting layers 50 are formed over predetermined areas of the surface of the protective layer 74.

Next, description will be made about the operation and effect of the half mirror layer 70. In the state where the light source 21 is not turned on, that is, in the state where the outside is brighter, light from the outside is passed through light transmitting windows 11 of a cover 10, transmitted through the light guide plate 40, and then reaches the half mirror layer 70. Such light is reflected on the metal layer 73 of the half mirror layer 70, transmitted through the protective layer 72 and the ink layer 71 sequentially, transmitted through the light guide plate 40, and taken out through the light transmitting windows 11 of the cover 10. The light is colored with the color of the ink layer 71 when the light passes through the ink layer 71. As a result, the light taken out to the outside is recognized as a mixed color of the metallic color and the color of the ink layer. In this embodiment, the silver of Al and the yellow are mixed with each other so that the light is recognized as golden light.

On the other hand, when light from the light source 21 is introduced into the light guide plate 40 in the state where the outside is darker (for example, in the nighttime), the introduced light is transmitted through the half mirror layer 70 and reflected on the reflecting layers 50 because the metal layer 73 of the half mirror layer 70 is formed to be thin enough to transmit the light from the light source. The reflected light is transmitted through the half mirror layer 70 again, succeedingly transmitted through the light guide plate 40, and taken out through the corresponding light transmitting windows 11 of the cover. In such a manner, when the light source 21 is turned on, the color of the light emitted from the light source 21 is observed from the light transmitting windows 11 of the cover.

Not to say, the operation and effect of the scuff plate 1 according to the embodiment in the first aspect can be likewise performed also in the scuff plates 2 and 3.

Figure 6:
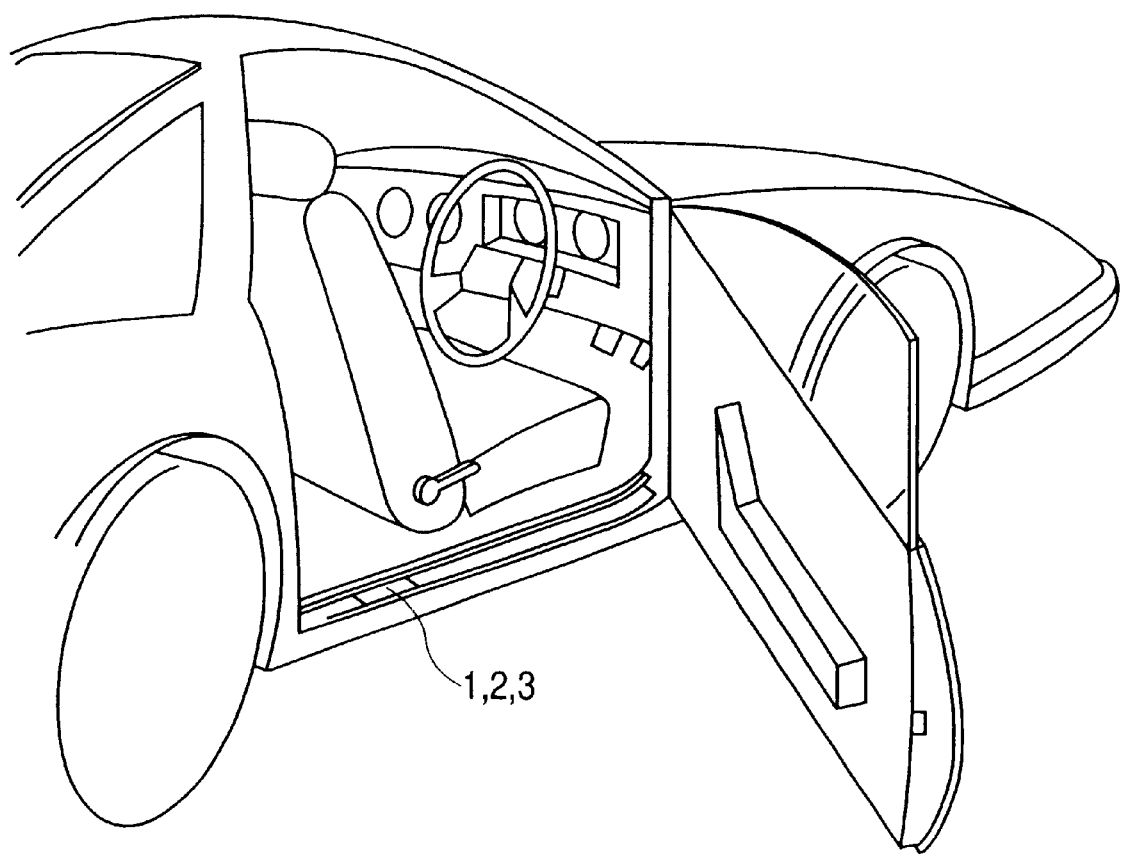
FIG. 6 is a perspective view of a car to which the scuff plate according to the present invention is applied.

FIG. 6 is a perspective view of a car to which the scuff plate according to the present invention is applied. The scuff plate is disposed in a side step portion of the car.

The present invention is not limited to the description of the embodiments according to the present invention but is applicable to various illuminating plates for a car. Various modifications which are able to be figured out easily by those skilled in the art without departing from the scope of the accompanying claims also belong to the present invention.

What is claimed is:

1. An illuminating plate for a car, comprising:
   a light guide plate;
   a light source which is located on a side end of said light guide plate;
   a cover disposed on a front surface of said light guide plate and provided with at least one light transmitting window; and
   at least one light reflecting layer formed on a rear surface of said light guide plate so as to cover at least a corresponding area where said light transmitting window is projected onto said rear surface, and said light reflecting layer not covering all over the rear surface of said light guide plate, wherein said light reflecting layer has a shape which is schematically similar to a predetermined shape of said light transmitting window.

2. An illuminating plate according to claim 1, wherein said illuminating plate is a scuff plate to be disposed in a side step portion of a car.

3. An illuminating plate according to claim 1, wherein said light reflecting layer is formed by white printing.

4. An illuminating plate according to claim 1, wherein said light source is constituted by an LED.

5. An illuminating plate for a car, comprising:

a light guide plate;

a light source which is located on a side end of said light guide plate;

a cover disposed on a front surface of said light guide plate and provided with light transmitting window; and at least one light reflecting layer formed on a rear surface of said light guide plate so as to cover at least a corresponding area where said light transmitting window is projected onto said rear surface, and said light reflecting layer not covering all over the rear surface of said light guide plate;

wherein at least one of said front surface and said rear surface of said light guide plate is subjected to half mirror treatment.

6. An illuminating plate according to claim 5, wherein said light reflecting layer has a shape which is schematically similar to a predetermined shape of said light transmitting window.

7. An illuminating plate according to claim 5, wherein each of said light reflecting layer is formed by white printing.

8. An illuminating plate according to claim 5, wherein said light source is constituted by an LED.

9. An illuminating plate according to claim 5, wherein said illuminating plate is a scuff plate to be disposed in a side step portion of a car.

10. An illuminating plate according to claim 5, wherein said half mirror treatment comprising:

a metal layer disposed on said light guide plate.

11. An illuminating plate according to claim 5, wherein said half mirror treatment comprising:

a metal layer disposed between said guide plate and said reflecting layer.

* * * * *